United States Patent

[11] 3,613,851

| | | | | |
|---|---|---|---|---|
| [72] | Inventors | William Edwin Ely;<br>Ralph R. Main, both of Troy, Ohio |
| [21] | Appl. No. | 847,030 |
| [22] | Filed | Aug. 4, 1969 |
| [45] | Patented | Oct. 19, 1971 |
| [73] | Assignee | The B. F. Goodrich Company<br>New York, N.Y. |

[54] SEGMENTED FRICTION MEMBER FOR BRAKE
OR CLUTCH
7 Claims, 2 Drawing Figs.

[52] U.S. Cl. .................................................. 192/107 R,
188/71.6, 188/218 XL, 188/264 AA
[51] Int. Cl. .................................................... F16d 13/60
[50] Field of Search .......................................... 188/218
XL, 71.6, 73.1, 73.2, 264 A, 264 AA; 192/107 R,
113 A

[56] References Cited
UNITED STATES PATENTS

| 3,426,871 | 2/1969 | Harnish ..................... | 188/218 XL |
|---|---|---|---|
| 3,452,844 | 7/1969 | Lallemant .................... | 192/107 |
| 3,456,768 | 7/1969 | Holcomb, Jr. ................ | 192/107 X |
| 3,473,635 | 10/1969 | Krause ......................... | 188/218 Axial |

FOREIGN PATENTS

| 906,629 | 9/1962 | Great Britain ................ | 188/218 Axial |

*Primary Examiner*—George E. A. Halvosa
*Attorneys*—John D. Haney and Harold S. Meyer ABSTRACT: A segmented friction member for a disc-type brake or clutch in which segmental facing members overlap heat-absorbing segments keyed to the rotating or nonrotating structure. The facing members are connected to the heat absorbing segments to form an annulus and also have interlocking members extending through the heat-absorbing segments to resist turning relative to the segments. Protection of the heat-absorbing segments from wear and high stresses is provided by the facing members in the area of frictional engagement and in the area where the segments are keyed to the rotating or nonrotating structure for transmitting torque thereto.

PATENTED OCT 19 1971

3,613,851

INVENTORS
WILLIAM EDWIN ELY
RALPH R. MAIN
BY John D. Haney
ATTY.

SEGMENTED FRICTION MEMBER FOR BRAKE OR CLUTCH

BACKGROUND OF THE INVENTION

This invention relates to the annular friction members of disc-style brakes or clutches and particularly to segmented friction members. The annular friction members engage other friction members during operation of a brake or clutch and must absorb great quantities of heat in high-energy brakes such as those used, for example, in aircraft. Friction linings may be carried on the surfaces of these friction members or these surfaces may engage friction linings carried by other friction members. They may also rotate with a wheel as rotors or be attached to the torque tube of a wheel support and operate as stators.

By using segmented annular friction members, thermal warpage and cracking are reduced; however, the problem is to assemble and connect the segments to provide a functional, efficient and durable braking member. This is especially difficult when the required brake structure for the friction members is a composite assembly made up of bodies of material having high heat-absorbing capacity and protective structural members which are of a material which will withstand high stresses and wear. The large temperature differentials to which these parts are subjected affect both the heat-absorbing material and the structural material of which they are made and it is therefore desirable that both of these parts be segmented.

In one form of segmented friction member the body of material having high heat-absorbing capacity is a continuous annular ring and the friction lining pads are segmental and mounted thereon. In another form of segmented friction member the heat-absorbing body is segmented and connected by links; however, the segments are in direct frictional engagement with other friction disc members of the brake. In still other forms of friction members the connections to the brake or clutch structures through splines and lugs has resulted in abrasion and binding of the parts. As mentioned heretofore, there have been a number of friction member designs with segmental parts; however, there is a need for a friction member construction in which both the heat-absorbing body and protective wear-resistant member are fully segmented to attain the maximum advantages from segmentation.

SUMMARY OF THE INVENTION

According to this invention an annular friction member for a brake or clutch is provided in which the component parts are fully segmented. Arcuate sector-shaped segments of material having superior heat-absorbing qualities are assembled in an annular ring with each segment being spaced from adjacent segments. Facing members of steel or other wear-resistant material also have an arcuate sector-shaped configuration and overlap each face of the heat-absorbing segments. The facing members are of substantially the same size as the segments; however, they are assembled so that each facing member is in overlapping relationship with two segments.

At the inner or outer periphery of the friction member the segments are slotted to receive splines or lugs of a torque-transmitting member of the brake or clutch structure such as a torque tube mounted on a wheel-supporting structure. These slots are disposed between projecting ears of the segments which are either radially outward or radially inward of the high-temperature swept zone of the friction lining carried by the facing member. A projecting flange of the facing member overlaps the ears of adjacent segments and is connected thereto by rivets extending through one facing member flange, the segment ears and through another facing member flange. An axially extending portion or tang of the flange of one facing member overlaps the ear and a load-bearing radially extending face of the slot in the segment. Another tang of the flange of another facing member overlaps the other ear and load-bearing face of the slot. The tangs provide wear-resistant slidable surfaces for engagement with a spline of the brake or clutch structure. This is important because during operation of this type of disc brake the friction members must be able to slide axially along splines into and out of engagement with other brake members.

Upon frictional engagement of the friction lining attached to the facing member with another braking member, forces are set up which tend to turn the facing member relative to the segments because of the different frictional torque at the radially outer and radially inner portions of the friction-lining surface caused by the different linear speeds of these portions. The resultant torque is resisted by a pair of connections to each facing member and to each segment. These connections are spaced circumferentially of the parts and when connected resist relative turning of the facing members and segments.

Although different types of connectors may be used the connections in this embodiment of the invention are in two holes in each segment located under the friction linings of the facing members. Each hole in a segment is overlapped by a pair of facing members between which the segment is sandwiched. The facing members have projections which extend into the hole and these may be connected by a serrated pin which is forced into matching holes in the projections.

The friction member assembly, therefore, has a series of circumferentially spaced segments of heat-absorbing material sandwiched between a series of facing member segments which overlap the heat-absorbing segments. Each pair of facing members has a riveted connection and a torque-resistant connection to one segment and the same connections to an adjacent segment. This provides a fully segmented friction member for a brake or clutch.

The accompanying drawings show one preferred form embodying this invention and which is representative of how this invention may be practiced.

DETAILED DESCRIPTION

Figures 1, 2:
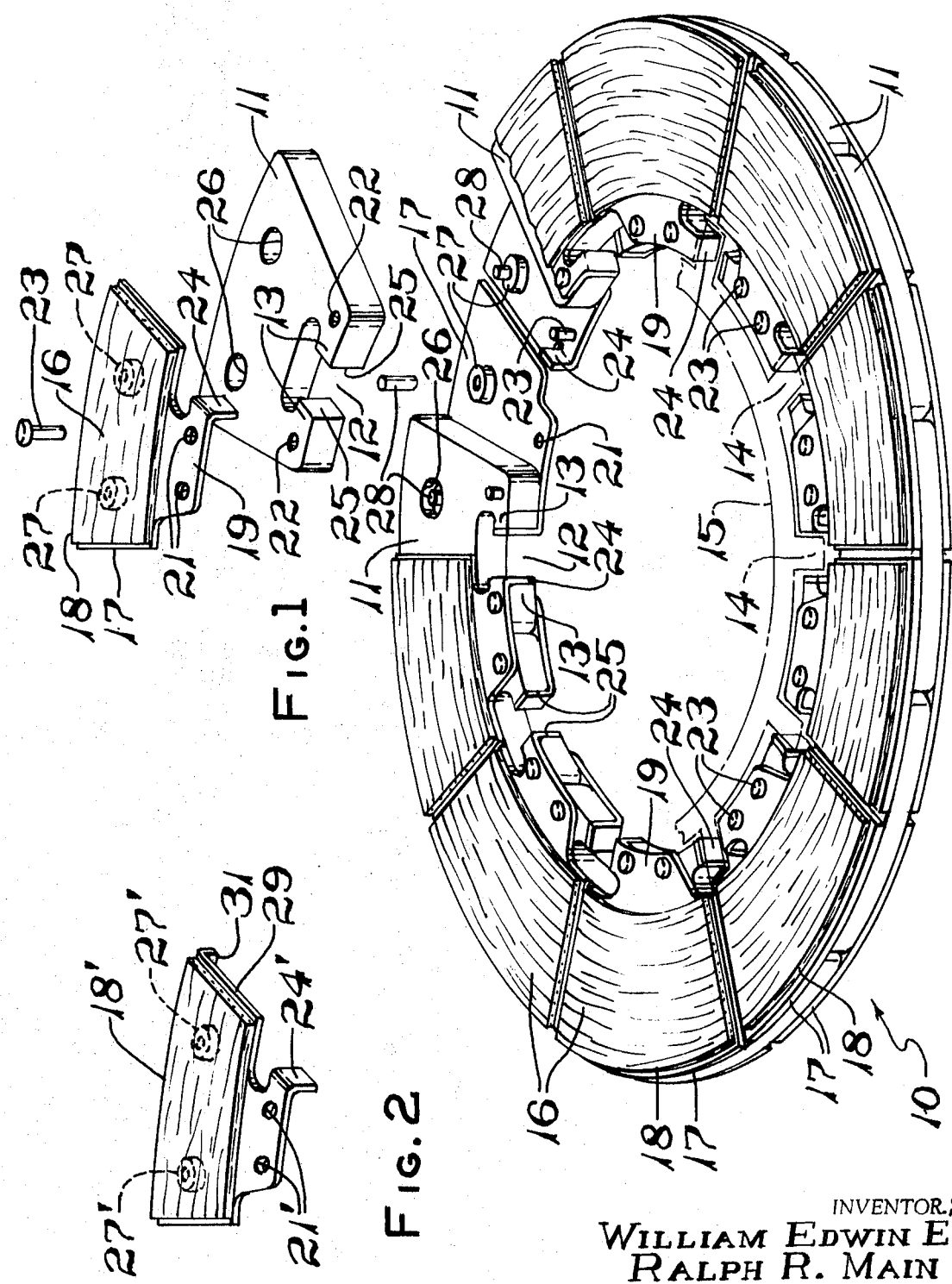
FIG. 1 is a perspective view of a part of an annular friction member assembly (shown in solid lines), certain parts being shown in exploded relationship or broken away with the annular friction member assembly being illustrated in torque-driving engagement with a related part which in this example may be a torque tube of a wheel-supporting structure, the sides of a part of the torque tube are represented by the chain-dotted line.
FIG. 2 is a view like FIG. 1 of the facing member showing a modification thereof.

Referring to FIG. 1 segmented friction member 10 is in the form of an annulus having a series of arcuate sector-shaped segments 11 disposed in spaced-apart positions around the annulus. Each of the segments 11 has configured means for transmitting torque at the inner periphery which in this embodiment consists of slots 12 located between radially inwardly extending ears 13. The segments are in driving engagement with mating interfitting driving pieces such as splines 14 on an associated brake or clutch member which in this example may be a torque tube 15 represented in FIG. 1 by the chain-dotted lines and which may be attached to a wheel-supporting structure.

The segmented friction member 10 acts as a stator in this example but it may be used if desired as a rotor as will be evident to those skilled in the art. The segmented friction member 10 is movable along the splines 14 in an axial direction so that radially extending faces 16 of the friction member may have frictional engagement with the faces of other brake parts. Overlapping these faces 16 of the segments 11 are facing members 17 which are also arcuate, sector-shaped and in this example of approximately the same shape as the segments 11. These facing members 17 may be of steel or other wear-resistant material and as shown in this embodiment carry friction linings 18 which may be of material of the type described and set forth in U.S. Pat. No. 2,966,737 of R. E. Spokes et al.

The friction linings 18 cover arcuate areas of the facing members 17 radially outward of the slots 12 which are in engagement with other braking members when the brake is actuated. This area where high temperatures are generated is referred to as the "swept zone."

Radially inward of the friction linings 18 on each of the facing members 17 are connecting flanges 19 which overlap the ears 13 of adjacent segments 11. Holes 21 in the flanges 19 of facing members 17 and holes 22 through the ears 13 of the segments 11 are provided to accommodate connections such as rivets 23 between a pair of the facing members and the segments sandwiched therebetween. The connecting flanges 19 connect the inner peripheral portions or ears 13 of the segments 11 forming a continuous ring which has the dimensional stability needed for proper registration of the slots 12 with the splines 14 so that axial sliding may occur without binding.

To further facilitate sliding of the segments 11 on the splines 14, circumferential extensions of the connecting flanges 19 such as tangs 24 are bent in an axial direction around the ears 13 to cover load bearing radially extending faces 25 of the slots 12. The tangs 24 being of wear-resistant material protect the material of the segments 11 from abrasion by the splines 14 and also present a smooth surface for improved sliding of the segments 11 of the segmented friction member 10 on the splines 14 of the torque tube 15.

Circumferentially spaced-apart connections in the segments 11 and in the facing members 17 at a position radially outward of the slots 12 and under the friction linings 18 are provided to resist the torque which tends to turn the facing members relative to the segments because of the different linear speeds of the friction-engaging surfaces which are at different radial positions. In this embodiment these connections are in cylindrical holes 26 of the segments 11 radially outward of the ears 13. One of the holes 26 is located between the friction linings 18 of one pair of facing members 17 and another of the cylindrical holes 26 is spaced circumferentially from the first hole under the friction linings 18 of another pair of facing members 17. Each of the facing members 17 is connected to the interposed segment 11 by cylindrical plugs 27 attached to the facing members as by spatot-welding and disposed in close-fitting alignment with the cylindrical holes 26 in the segments 11. These cylindrical plugs 27 may be drilled to receive a pin 28 which is serrated or grooved for pressing into the cylindrical plugs when pressure is exerted against the pin 28 upon assembly.

Referring to FIG. 2, a modified facing member 29 is shown which is identical with the facing members 17 except that the outer peripheral edge 31 of the facing member 29 is bent in an axial direction. This edge 31 contains and protects the segments 11. Cylindrical plugs 27' are fastened on one side of the facing member 29 and friction lining 18' is fastened on the other side. Likewise, holes 21' are disposed in a connecting flange 19' which has a protecting tang 24'.

The segmented friction member 10 described herein may be modified in an obvious manner so that the slots 12 may be provided at the outer peripheral edge of the segments 11 to engage an associated brake or clutch member having mating splines extending radially inward into engagement with the segments.

As illustrated in the drawings and described hereinabove the segmented friction member 10 has facing members 17 which bridge the gaps between the segments 11 and connect the segments through the rivets 23 and the cylindrical plugs 27 and pins 28 to provide a structurally continuous annular friction member. Since both the segments 11 and facing members 17 are segmental, the segmented friction member is fully segmented and the amount of warping and braking of the parts is at a minumum.

We, therefore, particularly point out and distinctly claim as our invention

1. A friction member for a brake or clutch comprising:
   a. heat-absorbing, load-bearing segments each with two side edges and an outer and an inner peripheral edge, one peripheral edge of which is configured for receiving torque loading from torque-transmitting elements of an associated brake or clutch part, and the segments being assembled with their side edges adjoining to form an annulus;
   b. a series of wear-resisting segmental facing members arranged with side edges adjoining to define an annular enclosure on the opposite sides of said annular assembly of the heat-absorbing segments to cover such opposing sides and frictionally engage other brake or clutch parts;
   c. the side edges of the facing members in each series thereof being arcuately offset from the corresponding underlying side edges of the heat-absorbing, load-bearing segments so that each facing member of its respective series overlaps the adjoining side edges of two underlying heat-absorbing segments;
   d. fastening means extending from each facing member of the series on one side of said segments, through the underlying heat-absorbing segments, to and into engagement with a corresponding facing member of the series enclosing the opposite side of said heat-absorbing members connecting said facing members and said segments for transmitting torque therebetween in a structurally continuous annular friction member;
   e. said facing members also having portions at said configured peripheral edges of said segments for engagement with the associated torque-transmitting elements of an associated brake or clutch part.

2. A friction member according to claim 1 wherein the segmental facing members are of a wear-resistant material different from that of said heat-absorbing, load-bearing segments and said segments are of a material having the property of absorbing heat at an extraordinarily great rate and for transmitting torque from said facing members to said torque-transmitting elements of an associated brake or clutch.

3. A friction member according to claim 1 wherein at least some of said fastening means are located at said configured peripheral edge for transmitting torque to said underlying segments.

4. A friction member according to claim 3 wherein the configured peripheral edge of each segment includes a slot in the periphery, and said facing members are connected to said segment at the sides of said slot.

5. A friction member according to claim 4 wherein the segment has load-bearing radially extending faces on each side of the slot, and the facing members have axially extending members overlapping said faces.

6. A friction member according to claim 3 wherein said fastening means includes connections spaced from said configured peripheral edge between said segments and facing members to resist relative turning thereof and transmission of torque therebetween.

7. A friction member according to claim 6 in which said connections comprise two connections to each of said segments and two connections to each of said facing members, said connections being located at circumferentially spaced-apart positions intermediate the peripheral edge portions of said segments and with a first connection to a segment being to one of said facing members and a second connection being to an adjacent facing member.